United States Patent Office 3,017,368
Patented Jan. 16, 1962

3,017,368
PROCESS FOR PREPARATION OF A CATALYST
George E. Elliott, Jr., Oakmont, Joseph B. McKinley, New Kensington, and Meredith M. Stewart, Penn Hills Township, Allegheny County, Pa., assignors to Gulf Research & Development Company, Pittsburgh, Pa., a corporation of Delaware
No Drawing. Filed Mar. 13, 1959, Ser. No. 799,099
6 Claims. (Cl. 252—439)

This invention relates to an improved method for the preparation of metal sulfide catalysts.

Mixtures of the sulfides of a metal of the left sub-group of group VI of the periodic table together with a metal of the iron group are active catalysts. Examples of preferred group VI, left sub-group, metals are tungsten and molybdenum and the iron group metals are iron, cobalt and nickel. Such catalysts have particular application in hydrogenation processes such as the hydrogenation of lubricating oils. Many methods of preparing these catalysts have been proposed but these methods have been unsatisfactory for various reasons.

One of the most active of such combination catalysts is a mixture of the sulfides of tungsten and nickel. A method which has been proposed for the preparation of a nickel sulfide-tungsten sulfide catalyst comprises first dissolving tungstic acid in excess aqueous ammonia to form an ammoniacal solution of ammonium tungstate. The ammonium tungstate is then converted to ammonium thiotungstate by reaction with an excess of a sulfiding agent such as hydrogen sulfide which also reacts with free ammonium hydroxide to form ammonium sulfide. To this alkaline solution of ammonium thiotungstate is added a sufficient amount of a soluble salt of nickel to obtain the desired molal ratio of tungsten to nickel. According to the previously proposed method the most suitable soluble nickel salt to be employed is nickel nitrate. Upon the addition of the nickel salt, the ammonium sulfide causes the precipitation of nickel sulfide. Thereafter, the tungsten is precipitated as tungsten trisulfide by the addition of a suitable acid, preferably sulfuric acid. According to the previously proposed method the mixed sulfide precipitate is then separated from the supernatant liquor, dried and treated with a gas, such as a hydrogen-containing gas, at a temperature of 250° C.–500° C., to reduce the tungsten trisulfide to tungsten disulfide.

The previously proposed method involves stepwise precipitation in a common medium of nickel sulfide which is insoluble in an alkaline solution and tungsten trisulfide which is insoluble in an acid solution. However, the nickel sulfide is partially soluble in an acid medium and consequentially a portion of the precipitated nickel sulfide dissolves and is lost following the sulfuric acid addition. In addition, in order to accomplish a quantitative precipitation of the tungsten as tungsten trisulfide it is necessary that the solution be rendered very highly acid. To render the solution sufficiently acid to precipitate substantially all the tungsten as tungsten trisulfide would result in dissolving an excessive amount of nickel sulfide and so a balance is sought which results in the addition of a sufficient quantity of acid for the precipitation of the largest possible amount of tungsten trisulfide coincident with acceptably low dissolving of nickel sulfide. The attainment of the optimum balance requires very close control of pH. According to the previously proposed method of preparation the optimum balance is achieved only after difficult and tedious control of pH and even with such control high losses of metals still occur. For example, losses of tungsten are sufficiently great that at least one process has been proposed for the recovery of tungsten from the supernatant liquid recovered in the preparation of a catalyst according to this previously proposed method. In addition to the loss of significant quantities of costly tungsten, large losses of nickel also occur. This loss of metal is even more pronounced when iron or cobalt is employed in place of nickel since iron and cobalt sulfides are more soluble in acid solution than is nickel sulfide.

In accordance with this invention we have discovered a method for the substantially complete avoidance of metal losses when preparing a mixed sulfide catalyst. The catalyst produced according to the method of this invention not only contains the group VI, left sub-group, and iron group metals in substantially quantitative amounts but also is much easier to prepare than similar catalysts prepared according to methods which result in large losses of active metals, such as the previously disclosed method described above, since it does not require close and tedious control of pH.

In accordance with the method of this invention a catalyst comprising the mixed sulfides of at least one group VI metal, left sub-group, and at least one iron group metal is prepared by acidifying a first alkaline solution containing a salt of a thio acid of at least one group VI metal, left sub-group, to a pH which is sufficiently low such that substantially complete precipitation of group VI metal as a sulfide occurs, sulfiding a second solution containing a soluble compound of at least one metal of the iron group which upon sulfiding forms compounds with the other materials present which are non-explosive under the conditions prevailing in the subsequent gas contact step and maintaining this second solution sufficiently alkaline throughout the sulfiding operation such that substantially complete precipitation of iron group metal as a sulfide occurs, separating the precipitate from the supernatant liquor in each solution, mixing these precipitates while in the wet state and contacting the resulting mixture with a hydrogen-hydrogen sulfide gas mixture at a temperature sufficiently high to convert group VI metal sulfide from a less stable to a more stable sulfide, the quantity of hydrogen sulfide in said gas mixture being sufficient to prevent any appreciable reduction in sulfur content of iron group metal sulfide.

In the precipitation of the iron group metal sulfide or sulfides, preferred methods involve adding hydrogen sulfide to an ammoniacal solution containing the iron group metal ammine compounds or salts or adding an ammonium sulfide or ammoniacal ammonium sulfide solution to an aqueous solution containing the iron group compounds or salts.

The precipitation of the group VI metal sulfide and the iron group metal sulfide in independent media permits the pH of each medium to be adjusted to whatever level is required for the substantially quantitative precipitation, as sulfides, of the respective metals. In a preferred embodiment of this invention, tungsten is employed as the group VI metal and is precipitated as tungsten trisulfide in a medium having a pH lower than about 1.0 and preferably lower than about 0.75 and most preferably lower than about 0.25, while nickel is employed as the group VIII metal and is precipitated as nickel sulfide in a medium having a pH at least as high as 8 and preferably at least as high as 10. In this manner the catalyst is prepared with substantially complete avoidance of metal losses.

Tests were performed to illustrate the avoidance of tungsten metal losses possible by employing the pH range of this invention in a catalyst preparation process. In these tests 1000 grams of tungstic acid were dissolved in 4000 milliliters of water and 4000 milliliters of 28 percent ammonium hydroxide. Two pounds of hydrogen sulfide were passed into this solution and the solution was stoppered and allowed to stand overnight. The next day the solution was divided into seven equal parts. Each part was acidified by the addition of 36 percent sulfuric acid to a predetermined pH value, each solution being acidified to a different pH. The precipitates formed by acid addition were vacuum filtered and the filtrates were subsequently passed through two consecutive gravity filters. The filtrates were subjected to quantitative analysis to determine tungsten content, thereby indicating the amount of tungsten lost by failing to precipitate at each pH. Following are the results of these tests.

| pH | Weight Percent Tungsten Lost | Δ Wt. Percent Tungsten Lost ΔpH |
|---|---|---|
| 1.70 | 22.07 | |
| | | 26.9 |
| 1.43 | 14.81 | |
| | | 22.3 |
| 1.22 | 10.12 | |
| | | 23.0 |
| 1.00 | 5.07 | |
| | | 12.9 |
| 0.86 | 3.27 | |
| | | 2.1 |
| 0.70 | 2.93 | |
| | | 2.0 |
| 0.48 | 2.49 | |

The above data show that substantial losses of tungsten metal exist at pH values even slightly greater than 1. For example, about a 10 weight percent loss of tungsten exists at a pH of 1.22. On the other hand, tungsten losses are sharply reduced at pH values even slightly lower than 1. For example, at a pH of 0.86 the tungsten loss is only about 3 weight percent. In addition, it is seen that the incremental weight percent tungsten loss per pH increment falls off rapidly at a pH near 1. The data show that this incremental ratio decreases from a value of 22 in the pH range of 1.22 to 1.00 to a value of only 13 in the pH range 1.00 to 0.86. At pH values below 0.86 it is seen that this incremental ratio decreases rapidly to about 2.

Tests were also made to illustrate the avoidance of nickel metal loss achieved by preparing a catalyst according to the method of this invention. These tests were performed by adding 687 grams of ammonium hydroxide (28 percent ammonia) to one liter of water and passing in 0.40 pounds of hydrogen sulfide. 1163 grams of nickel nitrate hexahydrate in three liters of water were then added to the original solution to precipitate nickel sulfide at a pH of about 8.2. Thereupon 36 percent sulfuric acid was added to adjust the pH to a predetermined pH value. The precipitate was filtered on a vacuum filter and the filtrate subsequently was passed through a gravity filter. The filtrate was then analyzed quantitatively for nickel metal content. The procedure was repeated for each test made, the only variation in each case being the amount of sulfuric acid which was added. Following are the data obtained through these tests.

| pH | Weight Percent Nickel Lost |
|---|---|
| 2.02 | 0.017 |
| 1.20 | 1.37 |
| 0.51 | 7.87 |
| 0.22 | 9.67 |

The above data show that nickel metal losses increase sharply at a pH near 1. For example, only about 1 weight percent nickel is lost at a pH of 1.20 whereas nearly 8 weight percent nickel is lost at a pH of 0.51.

It is seen from the above data illustrating tungsten metal loss and nickel metal loss at various pH values that the tungsten metal loss increases sharply at pH values greater than 1 and nickel metal losses increase sharply at pH values less than 1.

We have found the group VIII metal compound or salt which is employed must form compounds with the other materials present or added which are non-explosive under the conditions prevailing in the gas contact step since we have found that certain group VIII metal salts form explosive compounds which become occluded or mixed with the wet sulfide precipitate and explode violently during this gas contact step. The carbonate, acetate, chloride, bromide, iodide, etc., in simple form or as ammonium ion complexes to render them soluble are examples of compounds or salts which form compounds with the other materials present or added which remain heat-stable or inert to the extent of being non-explosive under the conditions prevailing during the gas contact step. Group VIII metal nitrates are examples of salts which react with other materials present or added to form a substance, ammonium nitrate, which is explosive at the elevated temperature conditions employed during the subsequent gas treatment operation. We have found that when employing group VIII metal nitrates in accordance with the method of this invention a violent explosion occurs during the gas treatment operation. In order to avoid the explosion which occurs during the gas treatment operation when a nitrate is present it is necessary to either remove or destroy the nitrate prior to the gas treatment step. The nitrate, in the form of ammonium nitrate, can be removed by separating the precipitate from its supernatant liquor and washing the precipitate with water. However, this entails the loss of some iron group metal since the iron group metal sulfides become peptized and are lost as colloidal dispersions in the wash water. The nitrate can also be destroyed by the addition of sulfuric acid. In the reaction resulting from the addition of sulfuric acid the nitrate is destroyed by being reduced to nitrogen dioxide gas coincident with precipitation of sulfur crystals. The nitrogen dioxide gas bubbles out of the solution and the sulfur crystals can be allowed to remain and thereby reduce the proportion of hydrogen sulfide necessary in the reducing gas stream employed in the subsequent reducing operation. This reaction inherently occurs in the previously proposed method of preparation described above. However, the addition of an acid is not desirable since iron group metal sulfides tend to dissolve in acid solution and in this manner a portion of the iron group metal is lost. It is therefore seen that either the removal or destruction of the nitrate inherently results in a loss of some of the catalytic metal which is present.

In accordance with this invention, the sulfide precipitates are removed from their separate solutions and are mechanically mixed while wet and subjected to treatment with a hydrogen-hydrogen sulfide gas stream containing at least sufficient hydrogen sulfide to prevent substantial reduction of the iron group metal sulfide to a lower sulfide or to the metal while containing sufficient hydrogen to permit reduction of the group VI, left sub-group, metal sulfide to the disulfide. The latter reaction may occur partially by thermal means at the treating temperatures employed. This gas treatment step proceeds for approximately one-third to twenty hours and preferably about one to four hours.

The gaseous temperature to be employed is at least 700° F. generally and preferably between 725° F. and 800° F. These temperatures are sufficiently high to allow conversion of the tungsten trisulfide by reduction and thermal decomposition to tungsten disulfide. At 800° F. as little as about 0.025 volume percent hydrogen sulfide in the gaseous stream will prevent reduction of tungsten disulfide to a lower sulfide state while at 700° F. only about 0.001 volume percent of hydrogen sulfide is necessary to prevent tungsten disulfide reduction.

The gas treatment step in the method of this invention serves to precondition the catalyst in several advantageous ways. Thus this gas treatment step serves to purify the catalyst of various contaminating materials such as ammonium compounds which would be harmful contaminants to a subsequently treated hydrocarbon oil. It also serves to stabilize the catalyst and put it into an advantageous state for forming as by pelleting to which these catalysts are usually subjected. In the case of tungsten the advantageous stable form is tungsten disulfide and for nickel it is nickel sulfide. When the tungsten disulfide-nickel sulfide mixed catalyst is used for hydrotreating petroleum oils, the amount of sulfur usually present in the oils which is converted to hydrogen sulfide during hydrotreating is almost always sufficient to supply the very low concentration of hydrogen sulfide necessary to prevent reduction of the tungsten disulfide to the metal. This amount of hydrogen sulfide formed is usually not sufficient to prevent the reduction of NiS to a lower sulfide but it is usually sufficient to prevent reduction to the metal. This reduction of NiS to a lower sulfide such as $Ni_3S_2$ during use is beneficial in that it tends to increase porosity and accessibility of the catalyst. However, as indicated above it is quite important that the nickel be present as NiS or a higher sulfide while it is being formed. After forming the nickel can then be prereduced or can be reduced in situ in a petroleum oil hydrotreating operation.

The minimum amount of hydrogen sulfide gas to be employed in the gas stream used to treat the mixed metal sulfide catalysts of this invention increases slightly with increased gas treatment temperature and varies depending upon the particular iron group metal employed. If the iron group metal is nickel the least amount of hydrogen sulfide to be employed in the gaseous stream is about 8 volume percent at 700° F., or 12 volume percent at 800° F. The amount of hydrogen sulfide to be employed in the gaseous stream is higher in the case of cobalt and is lower in the case of iron. For example, in the case of cobalt, hydrogen sulfide should comprise approximately 40 percent of the gaseous stream and in the case of iron the amount of hydrogen sulfide in the gaseous stream can be a small fraction of 1 percent and 1 percent is quite adequate. At least the minimum amount of hydrogen sulfide in the gas stream specified in the case of nickel and cobalt is necessary to prevent reduction of these metals to a lower sulfide while the minimum amount of hydrogen sulfide specified in the case of iron is necessary to prevent reduction of iron to the metallic state. In all cases it is preferable to have a concentration higher than the minimum and it is preferable in all cases to employ at least 50 volume percent hydrogen sulfide.

In accordance with the method of this invention a mixed nickel sulfide-tungsten sulfide catalyst is prepared by precipitating nickel sulfide and tungsten sulfide from separate solutions. In a first solution, tungstic acid is reacted with concentrated ammonium hydroxide to give an ammoniacal solution of ammonium tungstate. The ammonium tungstate is reacted with a sulfiding agent, preferably hydrogen sulfide, to yield a solution of ammonium thiotungstate which upon addition of an acid, preferably sulfuric acid, at a temperature of approximately 100° F. to 105° F., precipitates tungsten trisulfide. It is desirable to employ sulfuric acid since the presence of ammonium sulfate keeps the tungsten trisulfide from peptizing thereby permitting easier filtration of the tungsten trisulfide. To insure the quantitative precipitation of tungsten as the sulfide enough acid is added to adjust the pH of the final slurry lower than about 1.0 before filtration. A strongly acid solution, having a pH lower than about 1.0, is required to accomplish a high degree of precipitation of tungsten as the trisulfide.

A nickel sulfide precipitate is prepared from a second and independent solution containing a soluble compound of nickel. The amount of nickel compound dissolved, in relation to the amount of tungstic acid employed in the first solution, is such that a final catalyst containing between approximately 1:0.25 and 1:5 and preferably between approximately 1:1 and 1:4 moles of tungsten to nickel is produced. The solution is then subjected to treatment with a sulfiding medium. Either the solution or the sulfiding medium are sufficiently alkaline to render the final medium containing precipitated nickel sulfide alkaline. Thus, for example, ammoniacal ammonium sulfide solution may be added to an aqueous solution of a nickel salt or hydrogen sulfide gas may be contacted with an ammoniacal solution of a nickel salt. Nickel sulfide precipitates from such an ammoniacal solution and is then filtered. In accordance with this invention, in order to achieve the substantially complete precipitation of the nickel present as nickel sulfide, the alkalinity of the solution at the conclusion of the sulfiding operation corresponds to a pH of at least 8.

The nickel sulfide and tungsten trisulfide precipitates are separated from their supernatant liquors by any suitable means, such as filtration, and are then intimately mechanically mixed while fully wet and dried under nitrogen at 250° F. until a major portion of the water is removed. Following the drying step the mixed sulfides are subjected to treatment by contact with a reducing gaseous stream.

The gaseous stream employed comprises at least approximately 8 percent by volume of hydrogen sulfide and preferably the gas stream comprises approximately 50 percent by volume hydrogen sulfide. The temperature of the reducing gas stream is at least 700° F. and preferably between about 725° F. and 800° F. At these temperatures the tungsten trisulfide is reduced and thermally decomposed to tungsten disulfide while the hydrogen sulfide present serves to prevent the further reduction of tungsten disulfide to metal and to prevent the reduction of the nickel sulfide present to nickel subsulfide, both of which would be deleterious to the catalyst during its initial forming. The non-hydrogen sulfide content of the gaseous stream comprises a reducing gas such as hydrogen. The reducing operation proceeds for between about one-third to twenty hours, but preferably one to four hours.

Following the gas treatment step, the sulfides are pelleted in a nitrogen atmosphere. No pelleting agent is necessary since the sulfides of tungsten and nickel and any free sulfur which may be present serve this purpose.

EXAMPLE 1

1250 grams of tungstic acid was mixed with ammonium hydroxide (28 percent $NH_3$). Hydrogen sulfide was added while maintaining a solution temperature of 100–105° F. The reaction flask was then cooled to 35° F. and sulfuric acid was added until the pH was below about 0.25 and substantially all the tungsten present was precipitated as $WS_3$. There was a copious evolution of hydrogen sulfide and the precipitate had a red-brown color. A second solution was prepared containing 627.2 grams of nickel carbonate dissolved in ammonium hydroxide (28 percent $NH_3$) and water to form the basic ammine carbonate in solution. Hydrogen sulfide was added with constant stirring to this second solution until substantially all the nickel present was precipitated as NiS. Each solution was filtered and the wet nickel sulfide precipitate was thoroughly mixed with the wet tungsten trisulfide precipitate in a dry box under nitrogen. The two sulfides showed signs of interaction for the wet mixture was more fluid than either of the individual cakes. The wet mixture was dried under nitrogen at 250° F. for 75 hours. The dried sulfides were roasted in a gas comprising 50 percent by volume of hydrogen and 50 percent by volume of hydrogen sulfide for four hours at 775° F. The roasted catalyst was pelleted in a nitrogen atmosphere (3/16 inch pellets) and these pellets were broken to 10–20 mesh in a nitrogen atmosphere. The finished catalyst contained substantially quantitative amounts of nickel and tungsten.

The catalyst prepared in accordance with Example 1 was tested for its activity in the hydrogenation of lubricating oils. This catalyst was employed in two tests, one carried out at 715° F. and the other carried out at 731° F., all other reaction conditions remaining uniform in both tests performed, i.e. a pressure of 3000 pounds per square inch gauge, a space velocity of 0.5 volume of liquid hydrocarbon charge per hour per volume of catalyst and a hydrogen circulation rate of 5000 standard cubic feet of hydrogen per barrel. The charge stock comprised a mixture of two volumes of Ordovician unpressable distillate and one volume deasphalted residuum having a gravity of 24.6° API, a viscosity of 654 SUS at 100° F. and 70.5 SUS at 210° F., a viscosity index of 95 and an iodine number of 12.6. The results of these lubricating oil hydrogenation tests are shown in Table 1.

*Table 1*

| Catalyst | Mechanically Mixed Precipitates of NiS and WS$_3$ | |
| --- | --- | --- |
| Reaction Conditions: | | |
| Temperature, °F | 715 | 731 |
| Pressure, Pounds per Square Inch Gauge | 3,000 | 3,000 |
| Space Velocity—Volume of Hydrocarbon per Hour per Volume of Catalyst | 0.5 | 0.5 |
| Standard Cubic Feet Hydrogen per Barrel | 5,000 | 5,000 |
| Total Product Gravity: | | |
| °API | 33.8 | 35.8 |
| Yield: Percent by Weight of 725° F. + Product | 74.7 | 64.5 |
| Properties of 725° F. + Product: | | |
| Gravity, °API | 32.3 | 33.4 |
| Viscosity, SUS— | | |
| 100° F | 250 | 200 |
| 210° F | 52.3 | 49.5 |
| Viscosity Index | 121 | 130 |
| Iodine Number | 2.1 | 2.4 |

Various changes and modifications can be made without departing from the spirit of this invention and the scope thereof as defined in the following claims.

We claim:
1. A method for the preparation of a catalyst comprising the mixed sulfides of at least one group VI metal, left sub-group, and at least one iron group metal comprising acidifying a first alkaline solution containing a salt of a thio acid of at least one group VI metal, left sub-group, to a pH which is sufficiently low such that substantially complete precipitation of group VI metal as a sulfide occurs, sulfiding a second solution containing a soluble compound of at least one metal of the iron group which upon sulfiding forms compounds with the other materials present which are non-explosive under the conditions prevailing in the subsequent gas contact step and maintaining this second solution sufficiently alkaline throughout the sulfiding operation such that substantially complete precipitation of iron group metal as a sulfide occurs, separating the precipitate from the supernatant liquor in each solution, mixing these precipitates while in the wet state and contacting the resulting mixture with a hydrogen-hydrogen sulfide gas mixture at a temperature sufficiently high to reduce group VI metal sulfide from a less stable to a more stable sulfide, the quantity of hydrogen sulfide in said gas mixture being sufficient to prevent any appreciable reduction in sulfur content of iron group metal sulfide.

2. A process for the preparation of a catalyst comprising the mixed sulfides of a group VI metal, left sub-group, and an iron group metal comprising acidifying a first alkaline solution containing a salt of a thio acid of a group VI metal, left sub-group, to a pH below about 1.0, sulfiding a second solution containing a soluble compound of a metal of the iron group which upon sulfiding forms compounds with the other materials present which are non-explosive under the conditions prevailing in the subsequent gas contact step and maintaining this second solution sufficiently alkaline throughout the sulfiding operation such that substantially complete precipitation of the iron group metal as a sulfide occurs, separating the precipitate from the supernatant liquor in each solution, mixing these precipitates while in the wet state and contacting the resulting mixture with hydrogen gas at a temperature sufficiently high to reduce the group VI metal sulfide from a less stable to a more stable sulfide, said gas containing a quantity of hydrogen sulfide sufficient to prevent any appreciable reduction in sulfur content of the iron group metal sulfide.

3. A method for the preparation of a catalyst comprising the mixed sulfides of a group VI metal, left sub-group, and an iron group metal comprising acidifying a first alkaline solution containing a salt of a thio acid of a group VI metal, left sub-group, to a pH below about 1, sulfiding a second solution containing a soluble compound of a metal of the iron group which upon sulfiding forms compounds with the other materials present which are non-explosive under the conditions prevailing in the subsequent gas contact step and maintaining this second solution at a pH above about 8, separating the precipitate from the supernatant liquor in each solution, mixing these precipitates while in the wet state, drying and contacting the resulting mixture with hydrogen gas at a temperature between 725° F. and 800° F., said gas containing at least 40 percent by volume of hydrogen sulfide.

4. A process for the preparation of a catalyst comprising the mixed sulfides of tungsten and nickel comprising acidifying a first alkaline solution containing a salt of a thio acid of tungsten to a pH of below about 1, sulfiding a second solution containing a soluble compound of nickel which upon sulfiding forms compounds with the other materials present which are non-explosive under the conditions prevailing in the subsequent gas contact step and maintaining this second solution at a pH above 8 separating the precipitate from the supernatant liquor in each solution, mixing these precipitates while in the wet state, drying and contacting the resulting mixture with hydrogen gas at a reducing temperature between 725° F. and 800° F., said gas containing at least 50 percent by volume of hydrogen sulfide.

5. A process for the preparation of a catalyst comprising the mixed sulfides of at least one metal selected from the group comprising tungsten and molybdenum and at least one iron group metal comprising acidifying a first alkaline solution containing a salt of a thio acid of at least one metal selected from the group comprising tungsten and molybdenum to a pH below about 1, sulfiding a second solution containing a soluble compound of at least one iron group metal which upon sulfiding forms compounds with the other materials present which are non-explosive under the conditions prevailing in the subsequent gas contact step and maintaining this second solution at a pH above about 8, separating the precipitate from the supernatant liquor in each solution, mixing these precipitates while in the wet state, drying and contacting the resulting mixture with hydrogen gas at a temperature sufficiently high to reduce said metal trisulfides to disulfides, said gas containing a quantity of hydrogen sulfide sufficient to prevent any appreciable reduction in sulfur content of iron group metal sulfide.

6. A method for the preparation of a catalyst comprising the mixed sulfides of at least one group VI metal, left sub-group, and and at least one iron group metal comprising acidifying a first alkaline solution containing a salt of a thio acid of at least one group VI metal, left sub-group, to a pH which is below about 1, sulfiding a second solution containing a soluble compound of at least one metal of the iron group and maintaining this second solution throughout the sulfiding operation at a pH of at least 8, separating the precipitate from the supernatant liquor in each solution, removing from the iron group precipitate compounds which are explosive under the conditions prevailing in the subsequent gas contact step, mixing said precipitates, drying at about 250° F. and contacting the resulting mixture with a hydrogen-hydrogen sulfide gas mixture at a temperature sufficiently high to reduce group VI metal sulfide from a less stable to a more stable sulfide, the quantity of hydrogen sulfide in said gas mixture being sufficient to prevent any appreciable reduction in sulfur content of iron group metal sulfide.

References Cited in the file of this patent

UNITED STATES PATENTS

| | | |
|---|---|---|
| 2,414,620 | Trimble | Jan. 21, 1947 |
| 2,620,362 | Stiles | Dec. 2, 1952 |

UNITED STATES PATENT OFFICE
CERTIFICATE OF CORRECTION

Patent No. 3,017,368                      January 16, 1962

George E. Elliott, Jr., et al.

It is hereby certified that error appears in the above numbered patent requiring correction and that the said Letters Patent should read as corrected below.

Column 8, line 6, for "snupernatant" read -- supernatant --; line 34, for "contaniing" read -- containing --; line 38, after "above" insert -- about --.

Signed and sealed this 29th day of May 1962.

(SEAL)
Attest:

ERNEST W. SWIDER
Attesting Officer

DAVID L. LADD
Commissioner of Patents